United States Patent [19]

Ziegler et al.

[11] Patent Number: 5,011,015
[45] Date of Patent: * Apr. 30, 1991

[54] CONTAINER FOR MAGNETIC TAPE CASSETTES WITH SET DISPLACING SPRING MEANS

[75] Inventors: Manfred Ziegler, Dornstetten; Edmund Koerner, Waldachtal, both of Fed. Rep. of Germany

[73] Assignee: Fischerwerke Artur Fischer GmbH & Co. KG, Waldachtal, Fed. Rep. of Germany

[*] Notice: The portion of the term of this patent subsequent to Sep. 30, 2006 has been disclaimed.

[21] Appl. No.: 167,833

[22] Filed: Mar. 14, 1988

[30] Foreign Application Priority Data

Mar. 14, 1987 [DE] Fed. Rep. of Germany ..... 3708356

[51] Int. Cl.$^5$ ............................................ B65D 85/672
[52] U.S. Cl. .................................... 206/387; 221/279; 312/12; 312/319
[58] Field of Search ............... 206/387; 221/227, 279; 312/319, 330 R, 333, 12, 111, 10

[56] References Cited

U.S. PATENT DOCUMENTS

| 2,273,644 | 2/1942 | Hope | 221/279 |
| 3,899,229 | 8/1975 | Acheret | 312/319 |
| 4,042,096 | 8/1977 | Smith | 221/279 X |
| 4,126,248 | 11/1978 | House | 221/279 X |
| 4,134,520 | 1/1979 | Collins et al. | 221/227 X |
| 4,216,857 | 8/1980 | Huang | 206/387 X |
| 4,538,729 | 9/1985 | Acheret | 206/387 |
| 4,632,248 | 12/1986 | Hsu | 206/387 |

FOREIGN PATENT DOCUMENTS 2144028 2/1985 United Kingdom ............... 206/387

Primary Examiner—Bryon P. Gehman
Attorney, Agent, or Firm—Michael J. Striker

[57] ABSTRACT

A container for storing a magnetic tape cassette or the like includes a housing and a slide. The slide is displaced in the housing from the inserted position to the extended position and vice versa by an automatically coilable spring strip which has a coil portion engaging the slide and an end fastened in the housing. The spring strip, upon winding up, exerts on the rear wall of the slide a spring force.

4 Claims, 1 Drawing Sheet

CONTAINER FOR MAGNETIC TAPE CASSETTES WITH SET DISPLACING SPRING MEANS

BACKGROUND OF THE INVENTION

The present invention relates to containers for storing magnetic tape cassettes or similar information carriers.

Known containers of the type under consideration include a slide which receives and holds a magnetic tape and which is displaceable in the housing of the container from the inserted position to the extended or opening position by means of a helical spring. This helical spring is positioned, for this purpose, between the inner rear wall of the housing and the rear wall of the slide. Thereby the helical spring does not deflect laterally as the slide is inserted into the housing, and it is necessary to guide the helical spring laterally. Consequently, as the slide is actuated considerable spring-related noise occurs, arising from the friction between the turns of the spring and the adjacent guide surfaces.

The use of helical springs is problematical in particular in conjunction with the slides which travel a considerable distance between the inserted position and the outwardly extended position. Where the path of the slide is long, there are inevitably considerable differences in the spring tension, and even in the opening or extended position of the slide the spring tension must still be sufficiently strong to hold a magnetic tape cassette stored on the slide against its own weight securely in the opening position of the slide. The result of this is that the helical spring is respectively strongly prestressed in the inserted position of the slide, whereby, if the slide is inadvertently unlocked, this slide is catapulted out of the housing, which is, of course, undesired.

SUMMARY OF THE INVENTION

It is an object of the present invention to provide an improved container for storing a magnetic tape cassette.

It is another object of the invention to provide a magnetic tape cassette storing container with which the aforementioned disadvantages of the prior art containers having helical springs would be avoided.

These and other objects of the invention are attained by a container for magnetic tape cassettes or similar information carriers, comprising a housing; a slide having a catch, engageable in said housing, and receiving and holding a magnetic tape cassette; and means to displace said slide after said catch has been released from said housing, between an inserted position in said housing and an extended position outwardly of said housing, said means including a spring strip which winds up automatically to displace said slide to said extended position.

The spring strip may be fastened at one end thereof to said housing in a region of an opening of said housing into which said slide is inserted, said spring strip including at another end thereof a spring coil which engages said slide as said spring strip winds up.

The slide has a rear wall which may be engaged by said spring coil.

The slide may include lateral guide means for said spring coil.

The housing may be provided with guide means on which said spring strip runs.

The spring strip may be reduced in width in the region of said one end fastened to the housing to avoid winding up of the strip in the region due to a spring tension.

The maximal diameter of said spring coil may be lesser than an internal height of said housing. This not only has the advantage that the housing height, as is predetermined in conventional containers of this kind, does not need to be altered, but also has the further advantage which resides in that the spring coil mounted at the end of the slide takes up only very little space with regard to the installation depth.

The use of the spring strip which winds up or rolls up automatically and thus acts on the slide with the spring coil ensures that, for the entire travel of the slide, there is a virtually constant spring force which is exerted by the spring coil on the slide.

The spring strip is secured to the housing base or bottom wall in the front region of the housing and runs in the direction of sliding of the slide. The spring strip and thus also the spring coil, may be of a sufficient width so that no additional guide elements be required for the spring strip or its spring coil. An almost silent, and a very uniform movement of the slide is obtained when the spring element according to the invention is utilized.

It is in principle also possible to fasten the free end of the spring strip in a reverse manner that is to the slide and to mount the spring coil fixedly in the housing. In the preferred embodiment, however, the free end of the spring strip is fastened to the housing as mentioned above, so that the spring coil, as it winds or rolls up, moves along in the direction of movement of the slide.

The aforementioned guide means for the spring means may be provided when a narrow spring strip is used. Such guide means which guide the strip can be formed on the housing, or alternatively on the slide.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
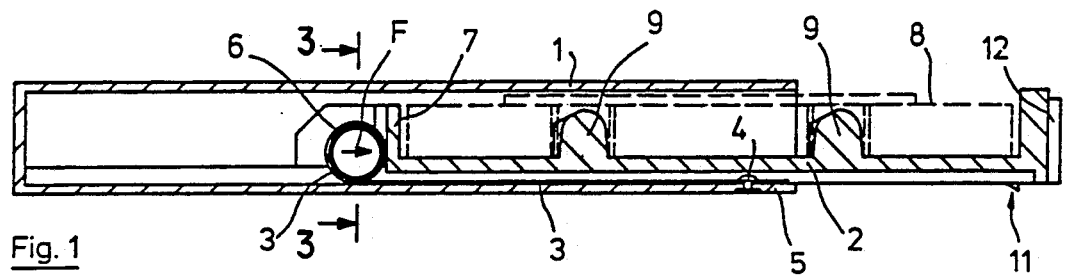
FIG. 1 is a cross-sectional view taken along line I—I of FIG. 2, of the container according to the invention.

Referring now to the drawings in detail, the container for magnetic tape cassettes or the like information carriers is consisted of a housing 1, a slide 2 and a spring strip 3.

The spring strip 3 is fastened at its free end, within the housing 1 to the bottom wall of floor 5 of the housing by a rivet 4. At the other end of the spring strip 3 the latter forms a spring coil 6 which presses with the spring force F against the rear wall 7 of the slide 2. The spring coil 6 and the slide 2 are illustrated in the drawing in an intermediate position, which is between the position of the completely inserted slide 2 and the opening position. A magnetic tape cassette 8, shown by a broken line, may be placed on the slide 2. Projections 9 molded on the inner wall of the slide 2 then engage in the hubs provided on the magnetic tape cassette 8.

Figure 2:
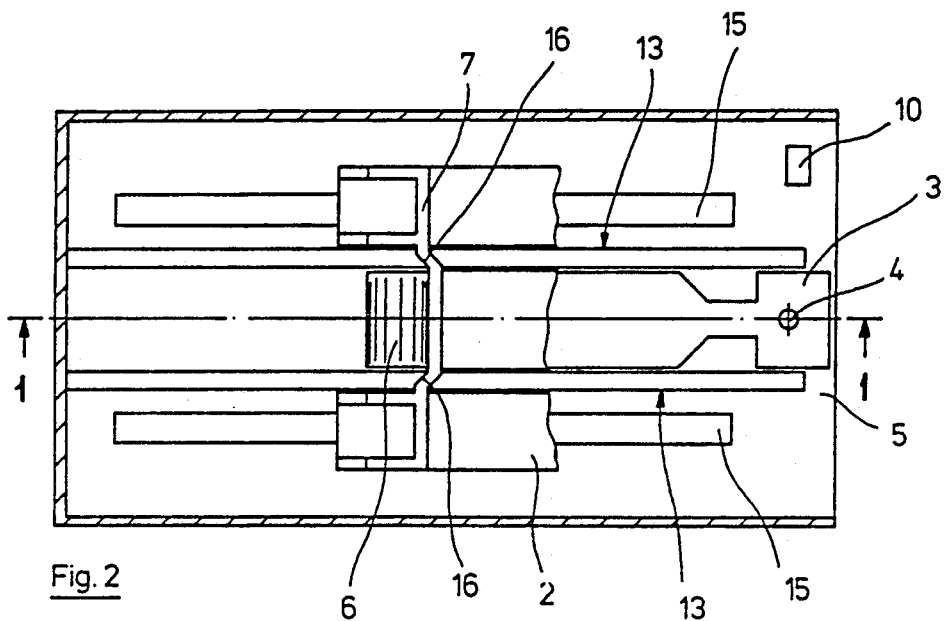
FIG. 2 is a cross-sectional axial view of the container of FIG. 1.

FIG. 2 shows only a part of the slide 2, but the attachment of the spring strip 3 to the housing floor 5 is readily apparent from this figure. also, a recess 10 is provided in the housing bottom wall 5, which is engaged by a catch 11 (FIG. 1) of the slide 2 in the inserted state thereof. The catch 11 can be unlocked by actuating a button 12, not shown here in detail.

Reference numeral 16 designates two lateral guides on the slide 2, which guide the spring coil 6 therebetween when the latter engages the rear wall 7 when the spring strip 3 causes the slide 2 to move outwardly of housing 1 as the spring strip 3 automatically winds up or coils up.

Figure 3:
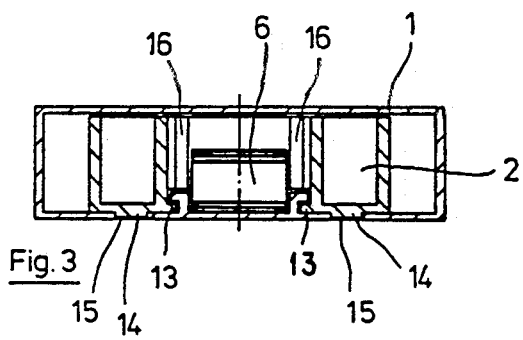
FIG. 3 is a sectional view taken on line III—III of FIG. 1.

The bottom wall 5 of housing 1 is formed so that it constitutes a guide on which the spring strip 3 runs, as clearly seen from FIG. 3. As shown in FIG. 2, strip 3 has a reduced width in the region near the rivet 4.

The slide 2, upon its insertion movement in housing 1, engages in lateral guide grooves 13 provided in the housing floor 5. The slide also has locking catches or projections 14 shown in FIG. 3. Locking projections 14 engage in recesses 15 provided in the bottom wall of housing 1 and determine the maximum opening position of the slide. The spring coil 6 has the length which corresponds to about one and a half times the maximum travel amount of the slide 2, so that even when the slide 2 is fully inserted into housing 1 the spring coil 6 is formed by at least by one complete turn of the spring strip 3. This ensures that the required spring force F is continually transferred from the spring coil 6 to the slide 2, and the spring strip 3 is able to roll up without difficulty in the direction of the opening or extended position of the slide.

It will be understood that each of the elements described above, or two or more together, may also find a useful application in other types of containers for magnetic tape cassettes or the like differing from the types described above.

While the invention has been illustrated and described as embodied in a container for magnetic tape cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Container for magnetic tape cassettes or similar information carriers, comprising a housing having an opening; a slide inserted into said opening of said housing and having a catch engageable in said housing, and receiving and holding a magnetic tape cassette; means to displace said slide after said catch has been released from said housing, between an inserted position in said housing and an extended position outwardly of said housing, said means including a spring strip formed so that it winds up automatically to displace said slide to said extended position, said strip having one end fastened to said housing in a region of said opening of said housing into which said slide is inserted, and another end provided with a spring coil which engages said slide as said spring strip winds up; and guide means including a bottom guide provided on said housing and guiding said spring strip from below, and two lateral guides provided on said slide and guiding said spring coil therebetween said spring coil having a maximum diameter which is lesser than an internal height of said housing.

2. Container as defined in claim 1, wherein said slide has a rear wall engaged by said spring coil.

3. Container as defined in claim 1, wherein said spring strip is reduced in width in the region of said one end.

4. Container for magnetic tape cassettes or similar information carriers, comprising a housing having an opening; a slide inserted into said opening of said housing, said slide having a rear wall and having a catch engageable in said housing and receiving and holding a magnetic tape cassette; means to displace said slide after said catch has been released from said housing, between an inserted position in said housing and an extended position outwardly of said housing, said means including a spring strip engaging said rear wall of said slide and formed so that it winds up automatically to displace said slide to said extended position, said strip having one end fastened to said housing in a region of said opening of said housing into which said slide is inserted, and another end provided with a spring coil which engages said slide as said spring strip winds up; and guide means including a bottom guide provided on said housing and guiding said spring strip from below, and two lateral guides provided on said slide and guiding said spring coil therebetween, said spring coil having a maximum diameter which is lesser than an internal height of said housing, said strip having a predetermined width, said lateral guides being laterally spaced from one another by a distance so as to guide said spring coil in contact with the slide.

* * * * *